United States Patent [19]

Dorn et al.

[11] 4,149,802
[45] Apr. 17, 1979

[54] DEVICE FOR MEASURING INK FILM THICKNESS

[75] Inventors: Alfred Dorn, Lammerspiel; Günther Schniggenfittig, Muhlheim; Edgar F. Schoneberger, Seligenstadt; Peter Schramm, Kahl; Klaus Wolf, Remscheid-Lennep, all of Fed. Rep. of Germany

[73] Assignee: Roland Offsetmaschinenfabrik Faber & Schleicher AG, Fed. Rep. of Germany

[21] Appl. No.: 867,983

[22] Filed: Jan. 9, 1978

[51] Int. Cl.² ............................................. G01B 11/06
[52] U.S. Cl. ................................... 356/381; 101/349; 250/239; 356/432; 356/244
[58] Field of Search ............... 356/161, 201, 244; 250/239, 560; 101/349; 118/9

[56] References Cited

U.S. PATENT DOCUMENTS

| | | | |
|---|---|---|---|
| 3,289,581 | 12/1966 | Roozee | 356/161 |
| 3,577,163 | 5/1971 | Riffe | 250/239 |
| 3,857,485 | 12/1974 | Frank | 356/246 |
| 4,115,009 | 9/1978 | Zepp et al. | 356/201 |

Primary Examiner—John K. Corbin
Assistant Examiner—William H. Punter

Attorney, Agent, or Firm—Leydig, Voit, Osann, Mayer & Holt, Ltd.

[57] ABSTRACT

A device for measuring ink film thickness in the inking system of a printing press which includes a pair of hollow transparent rollers, at least one of which is resilient so that when the rollers are in rolling engagement with one another and with an ink-carrying roller in the press, there is a longitudinally extending ribbon-like area of engagement between them through which an enclosed film of ink is fed in a thickness which varies in accordance with the thickness of the ink film in the press. A longitudinally extensive light projector in one of the rollers cooperates with a correspondingly dimensioned light collector in the other, the collector being coupled to a photocell having an output indicator. The projector and collector are both in the form of optical cross section transformers, the projector being coupled fiber-optically to an external light source. A filter assembly is interposed in the light path manually switchable for application, to the film, of light of complementary color. A logarithmic amplifier is used having an attenuator, coupled to the switch, for affecting the light level to compensate for differences in inherent opacity of the differently colored inks thereby to enable the indicator to respond directly in terms of film thickness regardless of color.

14 Claims, 4 Drawing Figures

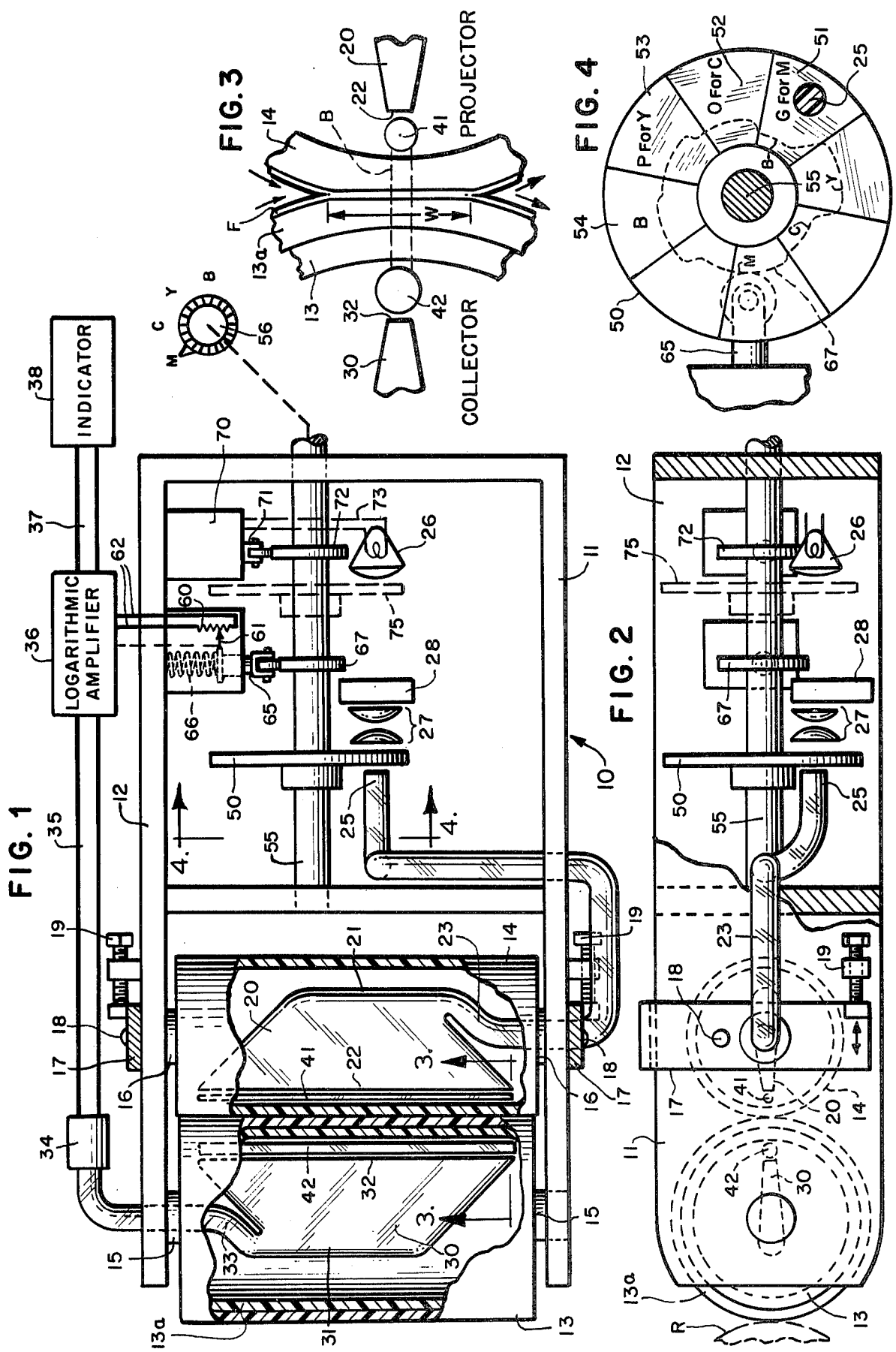

DEVICE FOR MEASURING INK FILM THICKNESS

Devices intended for measurement of the thickness of an ink film in a printing press are known in the art. For example, in German laid-open specification DT-AS No. 2 056 046 a device is disclosed employing a transparent roller which is in contact with an ink carrying roller of the inking system. A photocell in the interior of the transparent roller measures the light received through the ink film from a light source outside the roller, the light source shining, as well, on an outside photocell employed for reference purposes. The difference between the readings of the photocells is taken as an indication of ink film thickness.

Studies, however, show that readings taken with a device of this type cannot be relied upon. Transmission and reflection of light from the source are found to be highly dependent upon the surface texture of the film and the presence, in the film, of small air and water bubbles. Moreover, the heat liberated by the light source adjacent the film produces physical changes in the film so that it is no longer representative of the film existing in the press.

It is, accordingly, an object of the present invention to provide a device for measuring ink film thickness which is more accurate and reliable than conventional measuring devices. It is more specifically an object to provide a device employing a hollow transparent roller with light source and photocell in which such factors as film texture and the presence of small air and water bubbles do not affect the readings. Even more specifically, it is an object of the invention to provide a film measuring device in which the film at the point of measurement is enclosed, or captive, between two engaged transparent surfaces thereby avoiding any reflection factor and providing standardized conditions of measurement.

It is another object of the invention to provide a film thickness measuring device in which the film in unaffected by, and indeed isolated from, the heat from the light source; thus it is an object to provide a thickness measuring device in which the film being measured comprises a more accurate and continuous sampling of the film as it exists in the press.

It is yet another object of the invention to provide an ink film measuring device in which different wavelengths of light are employed to measure the thickness of different colored inks; in short, light is employed for measuring purposes having a color which is the complement of the color of the ink in order to maximize light absorption, to increase sensitivity, and to cause the measurement to vary more directly in accordance with opaqueness.

It is still another object of the invention to provide means for switching a predetermined filter into the light path when measuring the thickness of a particular ink while, at the same time, effectively attenuating the light level to compensate for differences in inherent opacity between inks, thereby to bring all readings into the same convenient range.

It is yet another object of the present invention to provide a film thickness measuring device in which the light source and light measuring means are mounted in a pair of hollow transparent rollers, with a light projector in one of them and a light collector in the other, both projector and collector being longitudinally extensive and efficiently coupled both to one another and to the light source to provide high efficiency in the use of available light.

Other objects and advantages of the invention will become apparent upon reading the attached detailed description and upon reference to the drawings in which:

FIG. 1 is a top view showing a device constructed in accordance with the present invention;

FIG. 2 is a side view of the device shown in FIG. 1 with certain portions broken away;

FIG. 3 is a fragmentary elevation, somewhat enlarged, looking along line 3—3 in FIG. 1;

FIG. 4 is a fragmentary elevation showing the switchable filter and looking along line 4—4 in FIG. 1.

While the invention has been described in connection with a preferred embodiment, it will be understood that there is no intention to limit the invention to the particular embodiment shown and that we intend to cover the various alternative and equivalent constructions included within the spirit and scope of the appended claims.

Turning now to the drawing, the illustrated measuring device has a frame 10 with side walls 11, 12. Mounted between the side walls are a pair of hollow transparent rollers 13, 14 journaled in bearings 15, 16, respectively. For establishing pressure between the rollers the bearings 16 have provision for slight lateral adjustment. This is accomplished by mounting them in a yoke 17 which is horizontally pivoted at 18 and provided with an adjusting screw 19, one such screw being used on each side if desired. The surface of the hollow roller 13 projects from the end of the frame, thereby making it accessible for application to the surface of a selected one of the ink-carrying rollers R in a printing press inking system. When the roller 13 is in running engagement with a film carrying roller R, a film F, proportional thereto, forms on the idly rotating rollers 13, 14 and exists at the region of contact of the latter rollers (see especially FIG. 3).

In accordance with the present invention at least one of the rollers is sufficiently resilient so as to establish a ribbon-like area of engagement between them through which an enclosed film of ink is fed. This is accomplished in the present instance by providing the roller 13 with a superficial layer of soft transparent plastic indicated at 13a into which the companion roller 14 slightly indents to provide a ribbon of engagement having a width W running the length of the rollers. The rollers 13, 14 are preferably made of unlike diameter, as shown, so that different regions of the respective rollers are successively brought into contact with one another thereby to insure a more even distribution of the ink film about the surface of the rollers.

Further in accordance with the invention a light projector is mounted in one of the rollers and a light collector in the other, the projector and collector each having extensive longitudinal edges closely spaced on opposite sides of the ribbon of engagement. Referring first to the light projector, indicated at 20, in the roller 14, it is in the form of an optical cross section transformer made of transparent plastic such as Lucite (polymerized methyl methacrylate resin) and of tapering cross section, varying from a thick base section 21 to a thin longitudinal light projecting edge 22. The base 21 is connected to a light conductor 23 of the fiber optical type which extends concentrically through the bearing 16 and which terminates in a light receiving end 25.

Light is fed to the end of the conductor from a lamp 26 of the high intensity "halogen" type. For efficient light transmission the conductor 23 may be in the form of a unitary smoothly polished Lucite rod or may be in the form of a bundle of light transmitting fibers without departing from the invention.

To make the light rays from the lamp more nearly parallel, they are passed through an interposed condensing lens 27. Moreover, for the purpose of filtering out the infrared, or heat, rays thereby to minimize the heat liberated at the film, an infrared filter 28 is interposed adjacent the lamp and centered in the light path.

For receiving, or collecting, the light emitted by the projector 20, a collector 30 is mounted in the companion hollow roller 13. The collector is also in the form of an optical cross section transformer, similar to the transformer 20, and having a relatively thick base portion 31 and a thin but extensive receiving edge 32 which is arranged parallel to, and in optical alignment with, the edge 22 on the projector. For conducting light from the collector a conductor 33 of the fiber optical type is led coaxially through the bearing 15 of the roller and into a photocell 34 which is preferably of the photoresistive type. The output terminal 35 of the photocell are fed to the input of an amplifier 36 having output terminals 37 which feed an indicator 38. The latter may take any form, providing either analog or digital indication and preferably reading directly in terms of film thickness.

Since the light transmitted through a semi-opaque film varies approximately as the anti-log of the film thickness, small changes in thickness tend to bring about wide swings in the output of the photocell. To convert the output signal to a signal more nearly representative of film thickness, the amplifier 36 is preferably of the logarithmic type, that is to say, the output varies in accordance with the logarithm of the input, amplifiers of this type being commercially available.

For insuring that the light beam from the projector to the collector is concentrated in a beam well centered with respect to the ribbon of contact W, the projector and collector are each provided with a condensing lens. Such condensing lenses are in the form of respective transparent rods of limited diameter, and which may be formed of lucite plastic or the like, indicated at 41, 42 and arranged respectively adjacent the projecting and collecting edges 22, 32 of the section transformers. The effect is to restrict the light passing through the transparent rollers to a beam B. The use of a thin, but longitudinally extensive, beam insures that any variations which might exist along the ribbon of contact are well averaged, thereby to provide a truly representative and reproducible reading.

In accordance with a further aspect of the present invention means are provided for modifying the light entering the projector 20 so that it is of a wavelength which is complementary to the color of ink being measured. More specifically a filter assembly is interposed between the lamp and the light conductor comprising a plurality of filter elements having colors which are complementary to the colors of the ink with which the measuring device is used, with manual switching means for interposing a selected one of the filter elements at will. Referring to FIG. 4 of the drawing, the filter assembly is in the form of a sectored disc 50 of which typical sectors are indicated at 51-54, the disc being interposed in the light path, preferably just ahead of the conductor 25. The disc is mounted upon a shaft 55 terminating in a manual setting knob 56. The filter elements 51-53 are preferably green, orange and purple, which are the complementary colors for the magenta, cyan and yellow inks commonly employed in color printing, while filter 54 is neutral or open for measurement of black ink; accordingly, the knob 56 has settings M, C, Y and B. The device, as illustrated, is set for the measurement of magenta ink. By using light of complementary color a truer measure of opacity, and hence thickness, is obtained. This can be understood by considering the fact the common black ink, which absorbs light of all colors, and which therefore may be tested without a color filter, produces readings which vary strictly in accordance with opacity. In the case of colored inks use of a complementary colored filter interposed in the light beam for testing purposes maximizes light absorption and tends to make each ink produce a response in terms of its opacity, in other words, reduces each ink to more nearly the common denominator of black ink, avoiding variations in response resulting simply from the color of the ink and not its opacity.

Further in accordance with the invention means are provided for effectively attenuating the light level to compensate for the differences in inherent opacity of differently colored inks. Conveniently this may be accomplished by providing the amplifier 36 with an adjustable attenuator, the attenuator being coupled to the switching means for automatically changing the degree of amplification in accordance with the filter being used. In the present instance the attenuator is indicated simply as an adjustable potentiometer 60 having a wiper 61 and which is connected to the amplifier by lines 62. For positioning the wiper, a cam follower 65, having a biasing spring 66, rides upon the periphery of a cam 67 fixed to the manually settable shaft 55. The steps of the cam corresponding to magenta, cyan, yellow and black have been indicated by corresponding letters in FIG. 4. Changing the amplifier gain when switching between colors compensates for the fact that an ink of one color will pass a different amount of light, for a given thickness, than the ink of another color; for example, a yellow film of given thickness will pass more light than a cyan film of the same thickness. By setting the amplifier gain independently for each color the output signal fed from the amplifier to the indicator can be made to fall within the same range. This makes it possible for the indicator 38 to be calibrated directly in terms of film thickness regardless of the color, or light transmission factor, of the ink which is the subject of test.

Rather than to compensate for the light transmissibility of different colored inks by modifying the output signal, the light may be directly attenuated at the source. This may, for example, be accomplished by providing a light attenuator 70 having a cam follower 71 which rides upon a cam 72 on shaft 55, with means for modifying the current allowed to flow through lines 73 associated with the light source. If the latter approach is used, precaution should be taken to avoid changes in the "color temperature" or color distribution of the light. Alternatively, and as apparent to one skilled in the art with the above teachings in mind, the cam follower 71 and 72 may be utilized to interpose a variably stepped shutter or neutral filter in the light path. If desired, the attenuators 60, 70 may be dispensed with and an auxiliary sector type filter assembly 75, similar to the filter disc 50, but employing neutral filter elements of different, compensating, density, may be mounted for synchronized stepping movement on the shaft 55. The neutral filter elements in such event would have a density which is inversely related to the inherent opacity of the ink. If desired, filters 50, 75 may be combined.

In making a test with an ink of given color, the measuring device in its 37 clean" condition is brought into contact with an inking carrying roller R. The length of the time of contact is not critical to the present invention but it is assumed that the device will be employed with sustained contact with the device being fitted, at least temporarily, into a convenient jig or fixture on the press. Ink film is "lifted" by the roller 13, passing between the region of engagement W of the rollers (FIG. 3) in an equilibrium thickness which is proportional to the thickness of ink film in the press system. It may be noted that feeding of ink film is a two-way street: after equilibrium is established during the first few revolutions, the direction of any subsequent net flow depends upon changes occurring on the roller R as a result of adjustment of the ink flow rate within the press. Thus where the press is adjusted to produce a thinner film on roller R, ink will, during subsequent revolutions, be fed from the transparent rollers back onto the source roller R, reducing the thickness of film in the region W until a new equilibrium is established. Thus the indicator 38 provides a constant, accurate, and up-to-date indication of the thickness of the ink film actually existing in the press inking system.

Because of reading directly in terms of film thickness and because of the rapid follow-up action, the fountain blade or other adjusting device in the press may be adjusted to produce a predetermined reading on the indicator 38, making it possible for a relatively inexperienced pressman, without exercise of judgment, to establish predetermined, standardized inking conditions. The device may be removed from the press, cleaned by running the roller 13 in contact with a source of solvent, set, by knob 56, to a different color of ink and then reimposed in the inking system of corresponding color. This will produce a prompt reading at the indicator 38, permitting the inking system of the new color to be adjusted to produce a predetermined reading. In this way all of the ink feed systems, including black, may be promptly adjusted to achieve optimum printing. Alternatively a number of test units may be used simultaneously and simply left in place for monitoring purposes.

It is found that by testing the film in its "enclosed" state, in the region in which the film is captive between adjacent transparent rollers, accurately reproducible results are achieved free of aberrations caused by the surface texture of the film or the presence of small bubbles of air or moisture.

What we claim is:

1. A device for measuring ink film thickness in the inking system of a printing press having an ink-carrying roller comprising, in combination, a frame, a first hollow transparent roller idly journaled in the frame and accessibly arranged for rolling engagment with the ink-carrying roller, a second hollow transparent roller idly journaled in the frame, at least one of the transparent rollers having a resilient surface, means for pressing the transparent rollers together so that the roller having the resilient surface is slightly indented to form a longitudinally extending ribbon-like area of engagement between them through which an enclosed film of ink is fed in a thickness which varies in accordance with the thickness of the ink film on the ink-carrying roller in the press, a longitudinally extending light projector in one of the rollers and a correspondingly dimensioned light collector in the other, the projector and collector being closely spaced parallel to one another with the enclosed film of ink substantially centered in between, and means coupled to the collector for indicating the amount of light being transmitted through the enclosed ink film thereby to provide an indication of the thickness of the ink film in the press.

2. The combination as claimed in claim 1 in which the transparent rollers have unlike diameters so that different regions of the respective rollers are successively brought into contact with one another thereby to insure a more even distribution of the ink film around the rollers.

3. The combination as claimed in claim 1 in which the projector is coupled to a light conductor of the fiber optical type, the conductor being coupled to a lamp located externally of the roller.

4. The combination as claimed in claim 3 in which a filter for filtering out infrared light is interposed between the lamp and the projector thereby to reduce the operating temperature at the projector to minimize the effect of lamp heat upon the film between the rollers.

5. The combination as claimed in claim 1 in which the light projector and light collector are both in the form of optical cross section transformers having respective output and input edges in closely spaced parallel relation, the projector having an input light conductor coupled to a lamp, the collector having an output light conductor coupled to a photocell, the light conductors being of the fiber optical type, and means including an indicator for indicating the output of the photocell.

6. The combination as claimed in claim 5 in which the light conductors are led axially into the respective hollow transparent rollers.

7. The combination as claimed in claim 1 in which a photocell and amplifier are interposed between the collector and indicating means, the amplifier being of the type in which the output varies substantially as the logarithm of the input.

8. The combination as claimed in claim 5 in which each of the transformers is of tapering section tapering from the dimension of the conductor to a thin longitudinally extensive edge, each of the transformers having a transparent cylindrical rod arranged along its edge to act as a condensing lens so that the light passing through the enclosed film is concentrated at the central portion thereof.

9. The combination as claimed in claim 1 in which the projector is coupled to a light source having a wavelength which is complementary to the color of the ink.

10. A device for measuring ink film thickness in the inking system of a printing press having an ink-carrying roller comprising, in combination, a frame, first and second hollow transparent rollers idly journaled in the frame, at least one of the rollers being accessible for rolling engagement with the ink-carrying roller of the press, means for pressing the transparent rollers together, at least one of the rollers being sufficiently resilient so as to establish a ribbon-like area of engagement between them through which an enclosed film of ink is fed in a thickness which varies in accordance with the thickness of the ink film on the ink-carrying roller in the press, a light projector in one of the rollers and a light collector in the other, the projector and collector each having extensive longitudinal edges centered and closely spaced on opposite sides of the ribbon-like area of engagement, the light projector having an input light conductor of the fiber optical type coupled to a lamp for furnishing of light to the projector, a filter assembly interposed between the lamp and the input conductor, the filter assembly comprising a plurality of filter elements having colors which are complementary to the colors of the inks with which the measuring device is used, manual switching means for interposing a selected one of the filter elements, the light collector having an output light conductor of the fiber optical type terminating in a phototcell, and means for indicating the output of the photocell thereby to provide an indication of the thickness of the ink film in the press.

11. The combination as claimed in claim 10 in which means are provided for effectively attenuating the light level to compensate for the differences in inherent opacity of the differently colored inks normally used in multi-color printing, the attenuator means being coupled to the switching means for automatically interposing attenuation in accordance with the color of ink under test thereby to compensate for the degree of opacity of the different inks normally employed in color printing and so that the indicator readings for all of the inks fall into the same range of indication.

12. The combination as claimed in claim 10 in which an amplifier is interposed between the photocell and indicating means, the amplifier having an adjustable attenuator, the attenuator being coupled to the switching means for automatically changing the degree of amplification in accordance with the filter being used thereby to compensate for the degree of opacity of the different inks normally employed in color printing and so that the indicator readings for all of the inks fall into the same range of indication.

13. The combination as claimed in claim 10 in which an auxiliary infrared filter is constantly interposed adjacent the lamp for blocking sensible heat from the filter assembly.

14. The combination as claimed in claim 10 in which a condensing lens is constantly interposed adjacent the filter assembly for conducting substantially parallel rays of light into the conductor.

* * * * *